United States Patent [19]

Neuman

[11] 4,299,707

[45] Nov. 10, 1981

[54] APPARATUS FOR FILTERING MELTED PLASTIC

[75] Inventor: Clayton L. Neuman, Coon Rapids, Minn.

[73] Assignee: A-1 Engineering, Inc., Minneapolis, Minn.

[21] Appl. No.: 138,194

[22] Filed: Apr. 7, 1980

[51] Int. Cl.³ .............................................. B01D 29/38
[52] U.S. Cl. ................................... 210/791; 210/316; 210/355; 210/413
[58] Field of Search ................ 210/316, 355, 413–415, 210/791

[56] References Cited

U.S. PATENT DOCUMENTS

| | | | |
|---|---|---|---|
| 2,125,532 | 8/1938 | Wells | 210/414 |
| 3,550,775 | 12/1970 | Cooler | 210/414 X |
| 4,045,345 | 8/1977 | Broai | 210/355 X |
| 4,177,234 | 12/1979 | Lowar | 210/415 X |

Primary Examiner—John Adee
Attorney, Agent, or Firm—Merchant, Gould, Smith, Edell, Welter & Schmidt

[57] ABSTRACT

The disclosure is directed to apparatus for filtering a flow of melted plastic prior to use in an injection molding machine. The apparatus includes a cylindrical filter screen disposed in a cylindrical chamber to define an inner inlet chamber and outer outlet chamber. The incoming plastic enters the interior of the filter screen through an axial passage formed in the screen side wall. The material is thereafter forced radially outward through small filtration openings formed through the screen side wall, leaving filtered material and contaminants at the inner wall. Purging or cleaning of the filter screen is effected by a reciprocating shaft that passes through the cylindrical filter screen and partly defines the inner chamber. The shaft carries an imperforate cylindrical sleeve which slides axially through the inner chamber, wiping the inner cylindrical surface of the filter screen as it goes. At the time that it passes by the filter screen, the cylindrical screen blocks communication between the inlet and inner chamber. However, the trailing edge of the sleeve is still exposed to the incoming plastic, which serves to force the sleeve axially beyond the screen, carrying with it the filtered material and contaminants, which are thereafter discharged from the exhaust ports.

24 Claims, 10 Drawing Figures

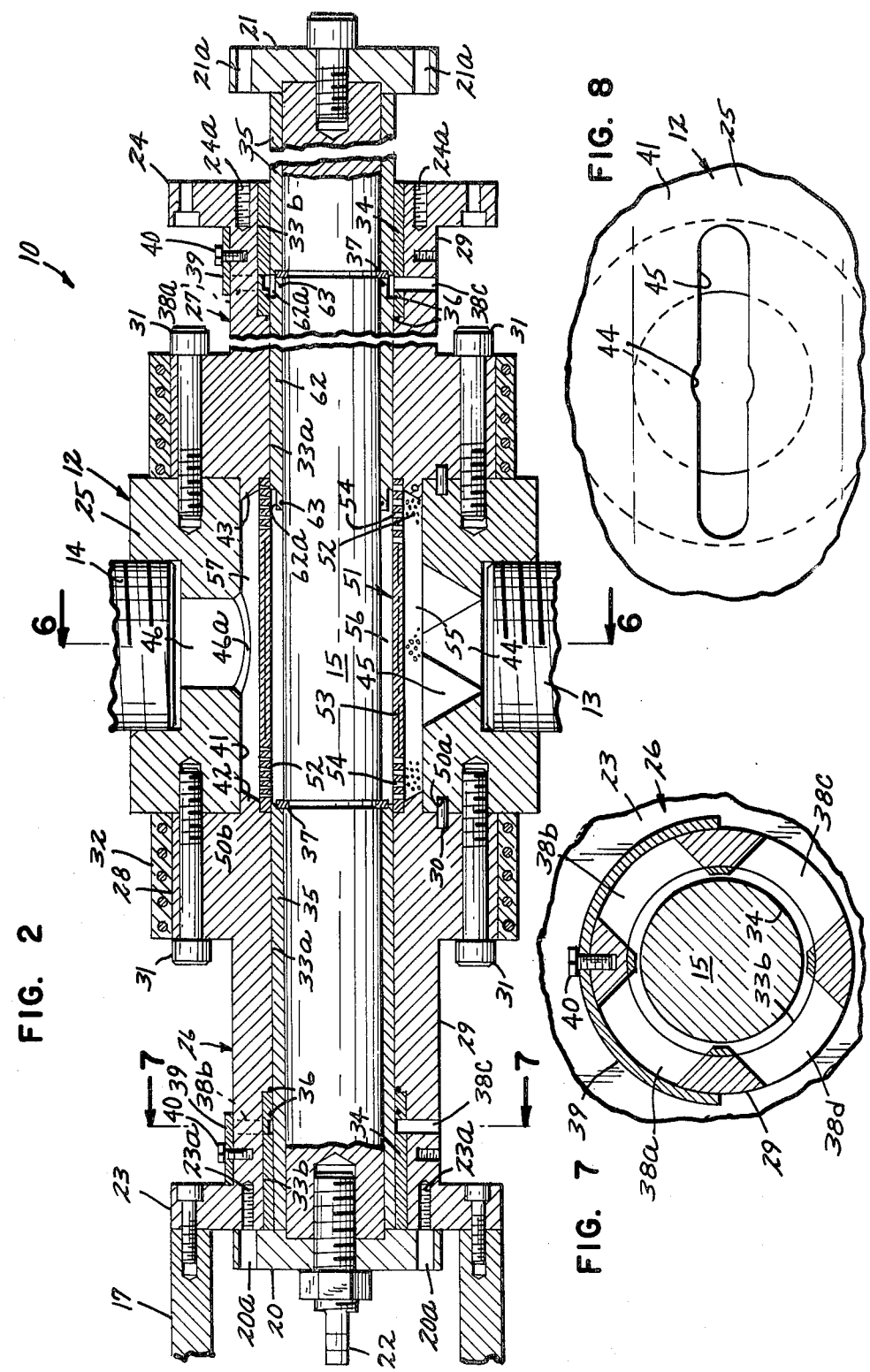

APPARATUS FOR FILTERING MELTED PLASTIC

TECHNICAL FIELD

The invention broadly relates to filtering apparatus, and is specifically directed to apparatus for filtering melted plastic prior to use in an extruding molding machine or similar operations.

BACKGROUND OF THE PRIOR ART

The process involved in the manufacture of plastic articles through injection molding requires filtering the plastic melt prior to injection. The filtration of the hot melted plastic raises a number of problems due to its viscosity and the need for accurate temperature control. The heavy viscous nature of melted plastic requires smooth flow at all times to avoid dead end spots and premature solidification. The filtration process must be substantially continuous and uninterrupted for the same reason; i.e., a static condition for an excessive period of time may cause premature solidification. At the same time, the temperature must be maintained within a fairly narrow range. Excessive temperature will burn the plastic and cause degradation, whereas temperatures which are too low compound the premature solidification problem.

Once the plastic has been raised to the proper temperature, it must be used relatively quickly and not allowed to exist in a stagnant state. However, the requirement for substantially continuous movement operates against the need to periodically clean the filtration apparatus, which eventually becomes clogged from the filtration of contaminants and other particulate matter. It is difficult to accomplish an objective of manufacturing high quality plastic articles when the filtering apparatus necessitates a shutdown of the operation while the filter screen is cleaned or replaced.

The filter purging or cleaning operation raises an additional problem because it invariably involves exposing the plastic flow system to air when the filtration apparatus is disassembled to service or replace the filter screen. Once air is introduced into the system, the flow of melted plastic must be run for a period of time to insure that all air bubbles or pockets have been discharged. This is not only time consuming, but also wasteful of the raw plastic, which is ordinarily discharged and lost until the air bubbles leave the system.

Thus, intermittent operation caused by periodic shutdown of the filtration apparatus for servicing, and the introduction of air into the plastic melt when the filter is serviced, create a difficult problem which with conventional devices is solved by consuming time and wasting raw product.

BRIEF SUMMARY OF THE INVENTION

The subject invention is the result of an endeavor to solve these existing problems in conventional melted plastic filters. The inventive filter apparatus broadly contemplates the continuous filtration of melted plastic and the periodic purging or cleaning of the filter screen without exposing the system to any air and without any substantial stoppage of flow.

This is accomplished by providing a housing having a central chamber through which an axial bore extends. A shaft member is disposed within the bore for reciprocal movement. A cylindrical filter screen is disposed in the central chamber in encircling relation to the shaft, defining an inner annular chamber with the shaft and an outer chamber with the inner housing wall.

An inlet to the housing communicates through a flow diffuser or distributor to the cylindrical filter element, which has an axially extending passage permitting the entry of unfiltered plastic into the inner annular chamber. The flow of plastic, which occurs at substantially high pressure, forces the plastic in the inner chamber radially outward through a plurality of small filtration openings for collection in the outer chamber. An outlet in the housing communicates with this outlet chamber and serves to discharge filtered plastic in the apparatus.

The inner cylindrical surface of the filter screen becomes clogged periodically due to the particulate matter and contaminants filtered from the plastic. To purge the screen, a cylindrical sleeve is carried on the shaft in a normal position which is remote from the filtering area. When the shaft is axially moved, the cylindrical sleeve, which is imperforate, slides axially through the chamber in wiping relation to the inner surface of the cylindrical filter screen. When the cylindrical sleeve occupies the chamber, it blocks the axial inlet passage of the filter screen and momentarily stops the filtration process. However, at the same time, the trailing end of the cylindrical sleeve continues to be exposed to the incoming plastic, and the pressure of the plastic causes the cylindrical sleeve to continue its axial movement to a position remote from the filter screen opposite that of its first remote position.

As the cylindrical sleeve moves through the chamber in wiping engagement with the inner screen surface, it carries with it a slug of plastic which previously existed in the chamber and which includes the filtered particulate matter and contaminants. This slug of plastic material is discharged from one or more exhaust ports in the housing as the cylindrical sleeve reaches its final position.

As the new flow of plastic moves in behind the cylindrical sleeve, the filtration process continues.

This structural configuration is important in two different respects. First, purging or cleaning of the cylindrical filter screen is accomplished by stroking the shaft in one direction by a hydraulic actuator. This movement takes on the order of 1-2 seconds, which is negligible insofar that the overall operation and flow of plastic is concerned. In the preferred embodiment, the apparatus is symmetrically configured and includes two sets of exhaust ports so that the purging operation may take place by stroking the shaft and cylindrical sleeve in either direction.

Secondly, the fact that the cylindrical sleeve is initially moved by the shaft and its movement completed by the incoming plastic, which fills the inner annular chamber as the sleeve leaves, insures that no air will enter the closed system during any part of the purging operation. As such, no time or material is lost due to the presence of air bubbles or pockets in the plastic melt, and operation continues virtually immediately after the purging operation has been completed.

BRIEF DESCRIPTION OF THE DRAWINGS

FIG. 2 is an enlarged fragmentary view of the filtration apparatus in longitudinal section;

FIG. 7 is an enlarged fragmentary transverse sectional view of the filtration apparatus taken along the line 7—7 of FIG. 2;

FIG. 8 is an enlarged fragmentary sectional view of the inlet of the filtration apparatus taken along the line 8—8 of FIG. 3;

DESCRIPTION OF THE PREFERRED EMBODIMENTS

Figure 1:
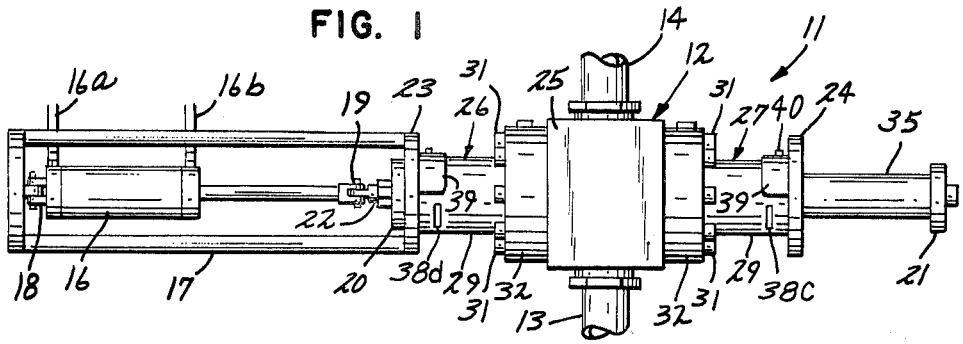
FIG. 1 is a fragmentary view in side elevation of filtration apparatus for melted plastic.

With initial reference to FIG. 1, apparatus for filtering melted plastic and embodying the inventive principle is represented generally by the numeral 11. The apparatus 11 broadly comprises a filtration housing 12 having an inlet 13 through which unfiltered, melted plastic is received, an outlet 14 through which filtered, melted plastic leaves the apparatus, and a reciprocating shaft 15 the movement of which effects cleaning of the filtration apparatus.

Reciprocation of the shaft 15 is accomplished by a two-way hydraulic actuator 16 having the usual ports 16a, 16b which is connected in a hydraulic system and operated in a conventional manner. The actuator is carried within a frame 17, with one end of its housing pivotally connected to one end of the frame as shown at 18. The actuator rod is pivotally connected to one end of the reciprocating rod 15 through a clevis 19.

With additional reference to FIG. 2, stops 20, 21 are bolted to each end of the shaft 15 to limit its lineal movement in each direction. The stop 20 comprises a circular plate or disc of greater diameter than the shaft 15, and it is bolted axially to the end of the shaft with a fitting 22 that receives the clevis 19. The stop 20 abuts an end flange 23 of the filtration housing 12, to which the frame 17 is also bolted.

The stop 20 includes a plurality of circumferentially spaced bores 20a which register with a like number of bores 23a in the flange 23. This permits the stop 20 to be temporarily bolted to the housing 12 for a purpose described below. Stop 21 abuts a similar end flange 24 at the opposite end of housing 12 in limiting relation.

With continued reference to FIG. 2, it will be seen that the housing 12 is of multiple component construction, comprising a center block 25 and a pair of end blocks 26, 27 upon which the end flanges 23, 24 are respectively formed. The end blocks 26, 27 are structurally identical (with the exception that end flange 23 serves as a mount for the frame 17), and a description of end block 26 will be exemplary. Except as otherwise noted, end blocks 26, 27 bear the same reference numerals.

End block 26 is formed with a large circular end flange or plate 28 at the end opposite end flange 23, and the two are integrally connected by a circular section 29 of lesser diameter. The end flange 28 is formed with a plurality of axially extending bores through which mounting bolts 31 project to mount end block 26 to center block 25. End block 26 is provided with a locator pin 30 that fits into a locator socket 50a in center block 25. A diametrically opposed locator socket 50b in center block 25 permits assembly with the end block 26 rotated 180°.

A heater band 32 encircles end flange 28 to heat the entire housing and maintain the melted plastic at the proper temperature as it flows through the apparatus. Heater band 32 (and the companion heater band on end block 27) is preferably of the electrical resistance type, and may be thermostatically controlled in a conventional manner by means not shown.

End block 26 has a large axial bore formed therethrough to receive the reciprocating shaft 15. This bore includes a first length 33a of predetermined diameter, and a shorter length 33b which is stepped to a slightly greater diameter. A bushing 34 is sized to fit into the stepped bore 33b, and its inner diameter approximates that of bore 33a to present a uniform inner diameter to a sleeve 35. A pair of teflon O-rings 36 are disposed between the bushing 34 and sleeve 35, permitting the latter to move axially while retaining a sealed relation.

Sleeve 35 is locked axially on the shaft 15 between the stop 20 and a split ring keeper 37 that is disposed in an annular groove formed within the shaft 15. As such, the sleeve 35 moves axially with the shaft 15 as it is reciprocated.

With reference to FIGS. 2 and 7, four equiangularly spaced exhaust ports 38a–38d are cross-machined into the circular section 29, each extending radially outward from the inner surface of the bore 33b. The bushing 34 is formed with appropriate arcuate slots which respectively communicate with each of the exhaust ports 38a–38d. As best seen in FIG. 2, the exhaust ports 38a–38d are not of substantial axial dimension, but in the transverse section of FIG. 7, they are of substantial width.

An arcuate cap 39 is secured to the circular section 29 by a bolt 40 in overlying relation to the ports 38a, 38b to close them, thus leaving only the ports 38c, 38d operative. The end block 26 may be rotated to permit other exhaust ports to be used for the purpose described below.

Center block 25 comprises a rectangular, tubular collar in which the inlet 13 and outlet 14 are diametrically opposed. Center block 25 has a large axial bore 41 formed therethrough which is of greater diameter than the adjacent bore 33a of end block 26 and the corresponding bore of end block 27.

With continued reference to FIG. 2, the outer axial face of end flange 28 is formed with an integral, axially projecting ring or ridge 42, the outside diameter of which is sized to guidably slide into the bore 41 of center block 25. A corresponding ring 43 of the end block 27 is shown in perspective in FIG. 9, and is identical to the ring 42. The rings 42, 43 have inclined or angled end surfaces 42a, 43a, respectively.

With reference to FIGS. 2 and 8, inlet 13 is connected to the bore 41 through a plastic flow distributor formed from a conical bore 44 that converges radially inward and is superimposed into a slot 45 that extends axially on the inner surface of bore 41 and also radially from the surface 41 outward to the inlet 13. This compound passage insures that the melted plastic will flow smoothly and evenly from the inlet into the filtration area defined below.

At the outlet side, a straight circular bore 46 interconnects the bore 41 with outlet 14 with the junction therebetween angled for smoothness as shown at 46a.

Figure 6:
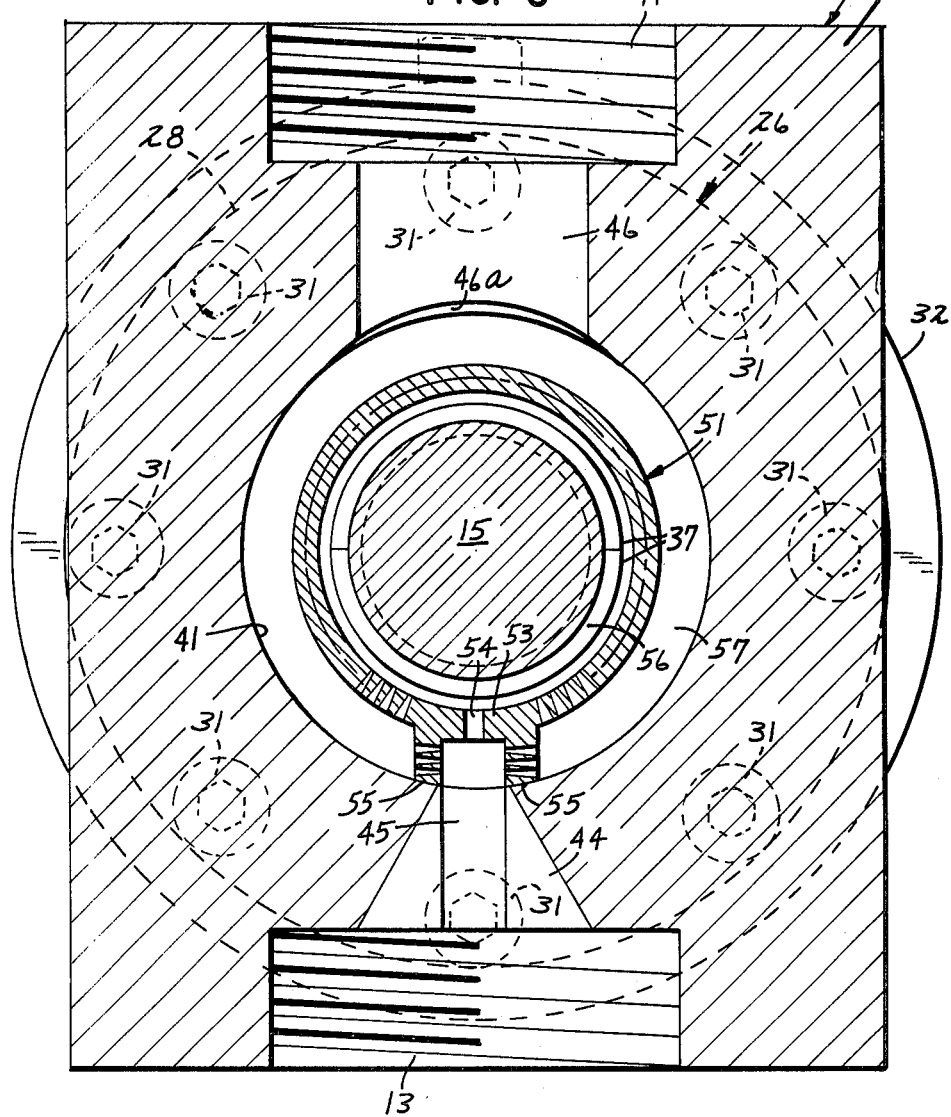
FIG. 6 is an enlarged transverse sectional view of the filtration apparatus taken along the line 6—6 of FIG. 2.

With reference to FIGS. 2–4, 6 and 9, a filter screen bearing the general reference numeral 51 is disposed in the bore 41 of center block 25. Filter screen 51 is generally cylindrical in shape and is formed with a relatively thick wall with a substantial plurality of filtration openings 52 formed therethrough. In the preferred embodiment, and as best shown in FIG. 6, the cylindrical wall of filter screen 51 does not extend through a full 360° degrees. Rather, this cylindrically shaped wall defines a gap or passage which extends axially over the entire length of the filter screen 51, and is filled by a longitudinal breaker plate 53 having an axially extending row of filtration openings 54. The ends of the cylindrical wall turn radially outward to define a pair of parallel, spaced stub walls 55 the radial dimension of which is chosen so that their outermost edge sealably engages the inner cylindrical surface of bore 41. The spacing between these stub walls 55 is such that they are disposed on opposite sides of the inlet slot 45.

The breaker plate holes 54 are arranged in three staggered axial rows, and are much larger in cross sectional size (3/16 inch in the principal embodiment) than the filtration openings 52. As such, and with specific reference to FIG. 6, plastic entering the inlet 13 flows through the conical bore 44 and elongated slot 45, thereafter entering into the space between stub walls 55. At this point, due to the size of the breaker plate holes, a substantial portion of the melted plastic passes through the openings 54 into the interior chamber of filter member 51 (reference numeral 56), where it is forced radially outward by extreme pressure through the filtration openings 52 into an annular receiving chamber 57 defined by the filter screen 51 and inner cylindrical wall of the bore 41.

In the preferred embodiment, filtration openings are also formed through the stub walls 55, thus enabling melted plastic to bypass the breaker plate holes 54. This is done to increase the filtration capacity of the filter screen 51.

With continued reference to FIG. 6, the filtration openings 52 diverge radially outward (i.e., they increase in cross sectional flow area), which insures that anything entering one of the filtration openings 52 will pass out of the opening, thus precluding clogging and the attendant breakdown of filtration. In the preferred embodiment, divergence is at approximately 2½ degrees relative to a true radius of the filter screen 51. In the preferred embodiment, the inlet diameter of each filtration opening 52 is on the order of 0.015, and the outlet diameter is on the order of 0.050.

The filtration openings are preferably formed in axial and circumferential rows that are staggered alternately to increase the total number of openings that can be formed.

Figure 9:
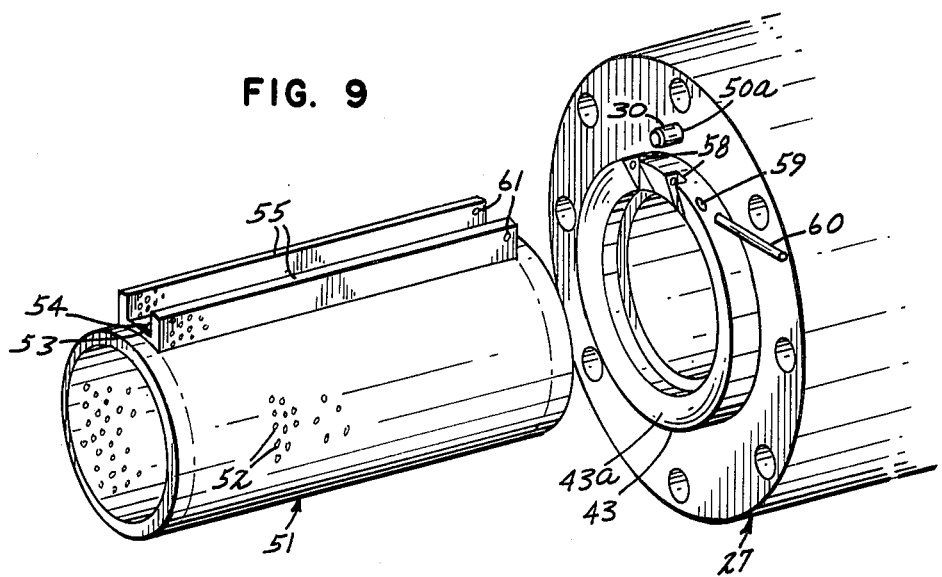
FIG. 9 is a perspective view of the annular filtration screen and its relationship to the filtration apparatus housing.
Figure 10:
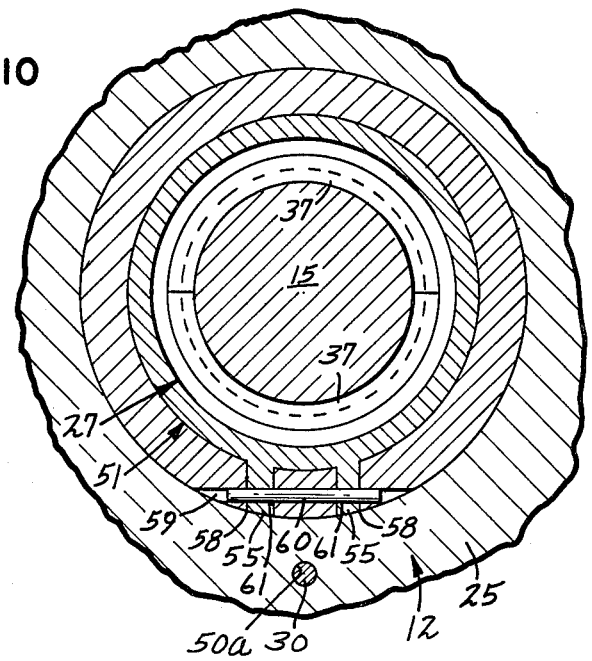
FIG. 10 is an enlarged fragmentary sectional view of the annular filtration screen taken along the line 10—10 of FIG. 3.

The axially extending ring 43 of end block 27 includes locking structure for the filter screen 51 which is best shown in FIGS. 9 and 10. This locking structure comprises a pair of parallel slots 58 that are sized and disposed to receive the extreme ends of the stub walls 55. A small bore 59 passes transversely through the slots 58 and accommodates a locking pin 60. Registering bores 61 are formed in the stub walls 55, thus permitting the pin 60 to lock the filter screen 51 into the assembled position.

It will also be observed in FIG. 9 that the stub walls 55 have a length which is less than that of the cylindrical wall of the screen. This permits the extreme part of each end of filter screen 51 to project in guided relation within the associated rings 42, 43, insuring a close fit between these components and adequate support of the filter screen 51 by the end blocks 26, 27.

Ring 42 of end block 26 is formed in an identical manner for purposes of manufacturing and part interchangeability, but only one locking structure is used to hold filter 51 in place.

Figure 3:
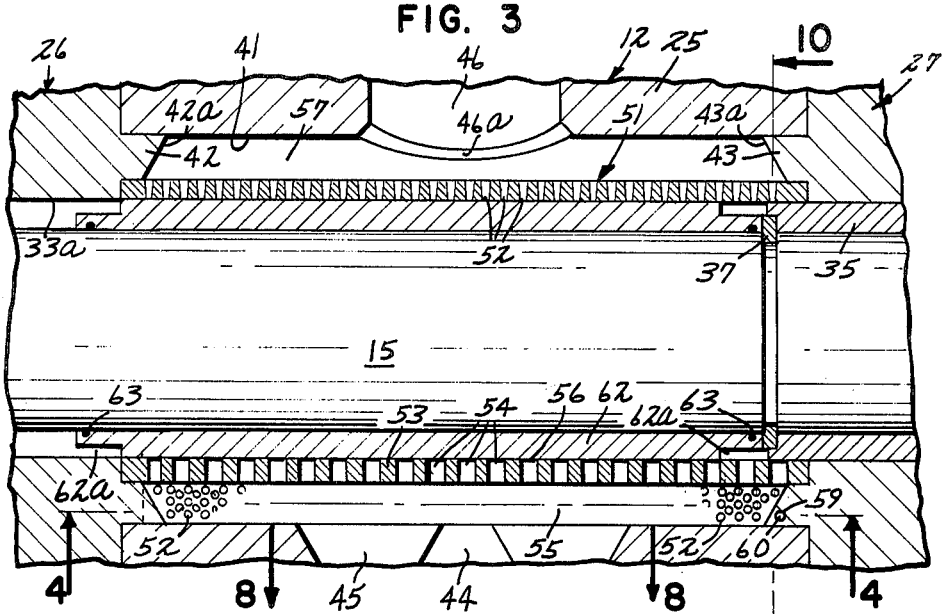
FIG. 3 is a further enlarged fragmentary sectional view of the apparatus, showing in particular the annular filter screen and its relationship to the movable screen cleaning sleeve.
Figure 4:
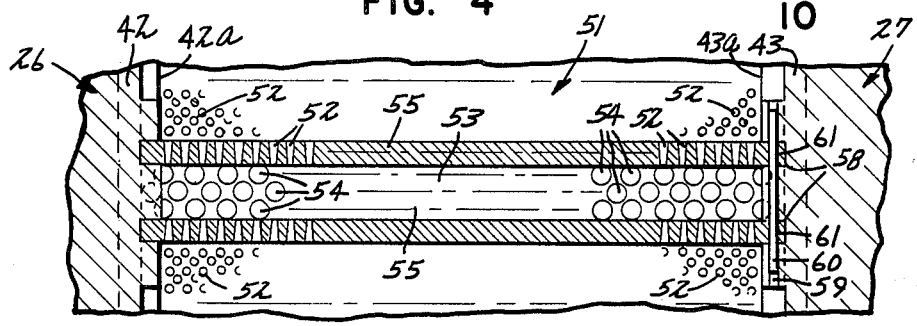
FIG. 4 is an enlarged fragmentary sectional view of the annular filter screen taken along the line 4—4 of FIG. 3.

With reference to FIGS. 2 and 3, a shuttle sleeve 62 is disposed on the reciprocating shaft 15 between the split ring keepers 37. Shuttle sleeve 62 has an inside diameter which permits it to slide axially relative to the reciprocating shaft 15, and an outside diameter which permits it to slide axially in close tolerance relative to the inner surface of bores 33a and the inner cylindrical surface of filtration screen 51.

Shuttle sleeve 62 is stepped at each end to define peripheral grooves 62a. A teflon O-ring 63 is disposed at each end for sealing relation with reciprocating shaft 15.

The overall axial length of shuttle sleeve 62 is chosen so that it occupies only a portion of the distance between split ring keepers 37. With the reciprocating shaft 15 in the position shown in FIG. 2, and with the shuttle sleeve 62 abutting the split ring keeper of end block 27, the extreme left end of shuttle sleeve 62 slightly overlaps the right end of filter screen 51 without affecting its operation. This position of shuttle sleeve 62, with reciprocating shaft 15 extended all the way to the right, is one of two positions of normal filtering operation. The other normal position for shuttle sleeve 62 occurs with the reciprocating shaft 15 moved axially to the extreme left position, and with the left end of shuttle sleeve 62 abutting the split ring keeper 37 of end block 26.

The purpose of shuttle sleeve 62 is to scrape material too large to pass through the filtration openings 52 from the inner cylindrical surface of the filter screen 51, where such material has collected. This is accomplished with axial movement of the shuttle sleeve 62, the outermost edge adjacent the peripheral groove 62a serving to scrape the inner cylindrical surface of filter screen 51 as it slides thereover.

During the normal filtering operation, melted plastic enters the inlet 13 and is distributed by the conical bore 44 and elongated slot 45 to the entire longitudinal space between stub walls 55. Most of the plastic flows through the filtration openings 54 of breaker plate 53, which serve to screen larger contaminants. A smaller amount of the flow passes through the filtration openings 52 in stub walls 55, passing directly into the outer annular chamber 57. The primary flow, after passing through the breaker plate filtration openings 54, is thereafter forced through the filtration openings 52 of the cylindrical wall of filter screen 51 to the outer annular chamber 57. As pointed out above, the filtration openings 52 diverge radially outward, thus insuring that any material that enters a filtration opening 52 will leave the opening. The contaminants are retained on the inner cylindrical surface of filter screen 51.

As best shown in FIGS. 2 and 6, the filtered plastic in outer chamber 57 flows toward the straight outlet bore 46 and then through outlet 14 where it is ready for use in the downstream injection molding process.

As the contaminants increase along the inner cylindrical surface of filter screen 51, the flow of melted plastic begins to slow down due to the increased pressure drop across the screen 51 and the clogging of filtration openings 52. The screen 51 is purged by moving the reciprocating shaft 15 from one position to the other by the hydraulic actuator 16. With the apparatus 11 as shown in FIGS. 1 and 2, the actuator 16 is retracted, moving the shaft 15 to the left until stop 21 abuts end flange 24. As this is done, the right end sleeve 35 moves with the shaft since it is locked between the split ring keeper 37 and the end stop 21. The bushing 34 and teflon O-rings 36 provide a positive seal and preclude any leakage of plastic. Shuttle sleeve 62 is also moved axially to the left during this movement of shaft 15 because the righthand split ring keeper 37 engages its right end. This causes the left end of shuttle sleeve 62 to scrape the inner cylindrical surface of filter screen 51, forcing the contaminants to the left as it goes.

FIG. 3 shows the righthand sleeve 35 and shuttle sleeve 62 in their respective positions with the stop 21 in engagement with the end flange 24. At this point, it will be noticed that the shuttle sleeve 62 overlies all but the last two or three circumferential rows of breaker plate openings 54 which effectively seals off the inner chamber 56. However, as shown in FIG. 3, the righthand peripheral groove 62a is directly exposed to inlet pressure to the two or three circumferential rows of breaker plate openings 54. The righthand sleeve 35 is stationary because shaft 15 has come to a stop. However, there remains an annular space between the shuttle sleeve 62 and the lefthand sleeve 35 and split ring keeper 37. Consequently, plastic under pressure enters the righthand peripheral groove 62a and forces shuttle sleeve 62 axially to the left until its left end engages the lefthand split ring keeper 37. During this movement, the incoming flow of melted plastic continues to fill the inner annular chamber 56 behind the right end of shuttle sleeve 62, maintaining the chamber full before any void can be created to introduce air into the system.

At the same time, the left end of shuttle sleeve 62 in moving axially to the left carries with it a slug of unfiltered plastic and contaminants. This material moves through the annular void, which is now an annular extension of inner chamber 56. The unfiltered plastic and the contaminants are then forced out of the exhaust ports 38c, 38d, and this slug of material may be disposed of in any convenient manner.

It is reiterated that, after shuttle sleeve 62 reaches the position shown in FIG. 3 by movement of the shaft 15 to the left, it is the pressure of the melted plastic entering the inlet 13 which forces the shuttle sleeve 62 the remaining distance to the left until it engages the split ring keeper 37. At all times, the flow of plastic precludes the creation of any void in the system and insures against the entry of any air.

After this movement by shaft 15, sleeves 35 and shuttle sleeve 62, the unit is in a position which mirrors that of FIG. 2. Since the shuttle sleeve 62 has moved away from the breaker plate opening 54, the inlet plastic which forced shuttle sleeve 62 to the left may now pass through the filtration openings 52, and the filtering process continues as before.

When the contaminants build up again within filter screen 51, the procedure is repeated in the reverse direction, with the shuttle sleeve 62 moving across the filter screen 51, carrying with it the slug of plastic and contaminants for discharge from the righthand exhaust ports 38c, 38d. When this step has been completed, the shuttle sleeve 52 returns to the position shown in FIG. 2.

The stroke of shaft 15 in either direction is on the order of 1–2 seconds, which is negligible in the overall injection molding process. Stated otherwise, the filter screen 51 may be purged instantaneously without interrupting the injection molding process, and without injecting any air into the system which would otherwise result in defective plastic articles.

As pointed out above, the breaker plate openings 54 trap larger contaminants within the longitudinal chamber defined by stub walls 55 and breaker plate 53. This build up of larger contaminants occurs less frequently, but requires purging eventually because it would otherwise block entry of the plastic into the inner chamber 56.

When a purge of the breaker plate chamber is necessary, the apparatus must be shut down for a short period of time. Reciprocating shaft 15 is moved to its leftmost position, and the bolts 31 securing end block 27 to center block 25 are removed. Connecting bolts are thereafter used to secure the stop 21 to end flange 24 via the bores 21a, 24a.

With the unit reassembled in this manner, actuator 16 is extended, carrying with it end block 27. Because filter screen 51 is locked to end block 27 by pin 60 (FIG. 9), filter screen 51 is also carried externally of the unit along with end block 27. The breaker plate chamber is thus exposed, permitting it to be cleaned.

Screen 51 may be removed in its entirety for servicing or replacement at this time simply by removing the connecting bolt for stop 21, which permits end block 27 and filter screen 51 to be removed from shaft 15.

The locator pin 30 and corresponding socket 50a are used to align end block 27 properly relative to center block 25 when the unit is reassembled.

As pointed out above, the end blocks 26, 27 are identical for simplicity of manufacturing and interchangeability. Either end block may be unbolted from the center block 25 and rotated 180 degrees before reassembly (locator pin 30 then fits into center socket 50b) to permit the use of exhaust ports 38, 38b. This also necessitates removal and relocation of the arcuate band 39 so that the exhaust ports in use are directed downward.

Figure 5:
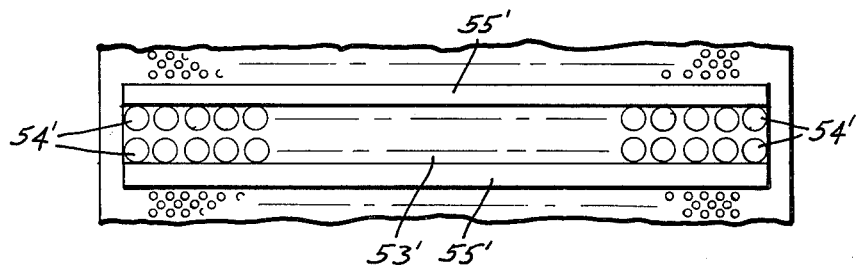
FIG. 5 is a view similar to that of FIG. 4 of an alternative embodiment of the annular filter screen.

An alternative breaker plate 53' is shown in FIG. 5. Breaker plate 53' includes two axial, nonstaggered rows of filtration openings 54' which are on the order of ¼ inch in diameter, which is slightly larger than filtration openings 54. In this embodiment, the stepped walls 55' do not include any filtration openings, so that all of the incoming plastic passes through the breaker plate 53 into the internal chamber 56. Operation is otherwise the same.

I claim:

1. Apparatus for filtering a flow of melted plastic, comprising:
   (a) a housing defining an internal chamber and having an inlet for unfiltered plastic and an outlet for filtered plastic, each communicating with said internal chamber, and exhaust port means for discharging material filtered from the flow of plastic;
   (b) a filter element disposed in said internal chamber and defining an inlet chamber communicating with said inlet and an outlet chamber communicating with said outlet;
   (c) said filter element having a surface of predetermined configuration on its inlet side;

(d) filter cleaning means conforming to the configuration of the inlet side surface of the filter element and engageably movable thereover to wipe filtered material from said inlet side surface;

(e) the filter cleaning means being movable from a first position remote from the filter element through a second position in which it substantially overlies the filter element and blocks all but a portion of the flow of melted plastic through the filter element, and to a third position beyond the second in which the filter cleaning means communicates with the exhaust port means;

(f) means for moving the filter cleaning means from the first position to the second position to wipe filtered material from said inlet side surface;

(g) the filter cleaning means being constructed and disposed so that it exposed to said portion of the flow of melted plastic in said second position and movable thereby to said third position to forceably discharge the filtered material from the exhaust port means.

2. The apparatus defined by claim 1, wherein the filter element is cylindrical and the inlet chamber is disposed within the filter element.

3. The apparatus defined by claim 2, wherein the means for moving the filter cleaning means comprises a reciprocating shaft carried by the housing and axially movable within the cylindrical filter element, the inlet chamber being defined between the external surface of the reciprocal shaft and the internal cylindrical surface of the filter element.

4. The apparatus defined by claim 3, wherein the filter cleaning means comprises a cylindrical sleeve having a wall thickness corresponding to the transverse dimension of the inlet chamber, the cylindrical sleeve being disposed for axial movement through said inlet chamber in wiping engagement with the inner surface of the cylindrical filter element.

5. The apparatus defined by claim 4, wherein the cylindrical sleeve is imperforate and approximates the length of the filter element.

6. The apparatus defined by claim 5, wherein the cylindrical filter element defines an axially extending inlet passage for receiving melted plastic from the housing inlet and communicating it to the inlet chamber.

7. The apparatus defined by claim 6, wherein the axially extending inlet passage of the cylindrical filter element comprises:
(a) an axially extending gap in the cylindrical wall of the filter element;
(b) a breaker plate disposed in said gap and having a plurality of inlet openings formed therethrough;
(c) and first and second stub walls projecting outwardly of the cylindrical filter element on opposite sides of the breaker plate, in parallel, spaced relation.

8. The apparatus defined by claim 6, wherein the cylindrical sleeve is carried by the reciprocating shaft from the first to the second position, in which it blocks a substantial portion of said axial inlet passage.

9. The apparatus defined by claim 8, wherein the cylindrical sleeve is formed with a peripheral groove at the trailing end thereof, said groove facing radially outward and exposed to a portion of said axial inlet passage with the cylindrical sleeve in said second position, whereby said portion of the incoming flow of melted plastic may enter said groove and force the cylindrical sleeve axially to said third position.

10. The apparatus defined by claim 9, wherein;
(a) the housing comprises two exhaust port means symmetrically disposed on opposite sides of the filter element and inlet and outlet chambers;
(b) the cylindrical sleeve has a peripheral groove formed at each end thereof;
(c) and the reciprocating shaft is constructed and arranged to move the cylindrical sleeve through identical but reverse cycles of filter element cleaning operation.

11. The apparatus defined by claim 10, wherein the means for moving the filter cleaning means further comprises a hydraulic actuator operably connected to the reciprocating shaft to move the shaft through said reversed cycles of filter element cleaning operation.

12. The apparatus defined by claim 1, wherein the filter element comprises a plurality of filtration openings each of which increases in cross sectional area in the direction of melted plastic flow.

13. The apparatus defined by claim 10, wherein the reciprocating shaft comprises first and second stops between which the cylindrical sleeve is slidably movable, the stops being disposed in a position so that the cylindrical sleeve is engaged by one of said stops as the reciprocating shaft moves in a first direction to move the cylindrical sleeve to the second position, the cylindrical sleeve engaging the other of said stops as it moves to the third position by said flow portion of melted plastic.

14. The apparatus defined by claim 13, wherein the reciprocating shaft comprises third and fourth stops cooperating with the housing to limit movement of the reciprocating shaft at each end of its cycles.

15. The apparatus by claim 14, wherein the housing comprises a center block in which said internal chamber is disposed, and a pair of end blocks secured to the center block in opposed relation.

16. The apparatus defined by claim 15, wherein the ends of the filter element are respectively carried by said end blocks.

17. The apparatus defined by claim 16, which further comprises means for releasably securing at least one end of the filter element to the associated end block.

18. The apparatus defined by claim 17, wherein the third and fourth stops respectively cooperate with the end blocks of the housing, and which further comprises means for releasably securing one of said stops to its associated end block.

19. The apparatus defined by claim 14, wherein the exhaust port means comprises a plurality of exhaust ports disposed in each of said end blocks and extending radially outward of said reciprocating shaft.

20. The apparatus defined by claim 19, which further comprises:
(a) means for adjustably mounting each end block in multiple positions relative to the center block;
(b) and cap means to block off selected of said exhaust ports.

21. The apparatus defined by claim 6, wherein the housing inlet comprises a conical bore that converges toward the filter element and is superimposed into an axially extending slot disposed in registering opposition to the axially extending inlet passage of the cylindrical filter element.

22. The apparatus defined by claim 1, which further comprises heating means disposed in the housing for maintaining the apparatus at a predetermined temperature.

23. Apparatus for filtering a flow of melted plastic, comprising:
- (a) a housing defining an internal chamber and having an inlet for unfiltered plastic and an outlet for filtered plastic, each communicating with said internal chamber, and exhaust port means for discharging material filtered from the flow of plastic;
- (b) a cylindrical filter element disposed in said internal chamber and defining an inlet chamber communicating with said inlet and an outlet chamber communicating with said outlet;
- (c) an imperforate cylindrical sleeve approximately the length of the filter element and slidable over the cylindrical inlet surface of the filter element to wipe filtered material therefrom;
- (d) the cylindrical sleeve being movable from a first position remote from the filter element through a second position in which it substantially overlies the filter element and blocks all but a portion of the flow of melted plastic through the filter element, and to a third position beyond the second position in which the cylindrical sleeve communicates with said exhaust port means;
- (e) means for moving the cylindrical sleeve from the first position to the second position to wipe filtered material from said cylindrical inlet surface;
- (f) said cylindrical sleeve being constructed and disposed so that it is exposed to said portion of the flow of melted plastic in said second position and is movable thereby to said third position to forceably discharge the filtered material from the exhaust port means, with said melted plastic filling the inlet chamber behind the cylindrical sleeve as it moves from the second to the third position to preclude the entry of air into the inlet chamber.

24. A method of filtering melted plastic comprising:
- (a) causing the plastic to flow under pressure through a filter element disposed in the internal chamber of a housing, the filter element dividing the internal chamber into inlet and outlet chambers, and the filter element having a surface of predetermined configuration on its inlet side;
- (b) moving a filter cleaning element conforming to the configuration of said inlet side surface from a first position remote from the filter element to a second position to wipe filtered material from said inlet side surface, the filter cleaning element blocking all but a portion of the flow of melted plastic through the filter element in said second position;
- (c) and exposing the filter cleaning element to said portion of flow in the second position to cause movement of the filter cleaning element by said portion of flow to a third position in which it forceably discharges material filtered from the flow of plastic through an exhaust port in the housing, with said melted plastic filling the inlet chamber behind the filter cleaning element as it moves from the second to the third position to preclude the entry of air into the inlet chamber.

* * * * *